United States Patent [19]

Draganov

[11] 4,454,992
[45] Jun. 19, 1984

[54] WET PROCESSING APPARATUS FOR RENDERING CELLULOSIC INSULATION PARTICLES FIRE-RETARDANT

[76] Inventor: Samuel M. Draganov, Tustin, Calif.

[21] Appl. No.: 469,918

[22] Filed: Feb. 25, 1983

Related U.S. Application Data

[60] Division of Ser. No. 183,359, Sep. 2, 1980, Pat. No. 4,386,118, which is a continuation-in-part of Ser. No. 32,119, Apr. 22, 1979, abandoned.

[51] Int. Cl.³ ............................................. B02C 19/12
[52] U.S. Cl. ........................................ 241/42; 241/60; 241/152 A
[58] Field of Search ................. 241/41, 42, 60, 152 A, 241/154, 161, 162; 427/212, 377

[56] References Cited

U.S. PATENT DOCUMENTS

| | | | |
|---|---|---|---|
| 2,118,252 | 5/1938 | Kraft | 241/60 X |
| 2,148,447 | 2/1939 | Dundas et al. | 241/42 X |
| 3,491,673 | 2/1976 | Lausch | 241/60 X |
| 3,666,544 | 5/1972 | Kuechler | 427/377 X |
| 4,012,507 | 3/1977 | Knoepfler et al. | 427/212 |

*Primary Examiner*—Mark Rosenbaum
*Attorney, Agent, or Firm*—Philip A. Mallinckrodt

[57] ABSTRACT

Particulate cellulose insulation material is rendered fire retardant by a wet process requiring considerably less fire retardant composition than normally employed in the usual dry processes or in wet processes proposed heretofore, and yielding a product with significantly enhanced insulating properties. Impregnation of a cellulosic insulating material, such as waste paper in finely divided form, with an aqueous solution of a non-hygroscopic fire retardant composition, such as boric acid, a borate, or the composition of U.S. Pat. No. 3,983,040, is carried out under conditions whereby a minimum amount of water is first utilized for the purpose of dissolving the fire retardant composition and to serve as a carrier in distributing it throughout the cellulosic insulating material. For example, only from about 14 to 45% by weight of add-on water is utilized in the presence of from about 5 to 10% by weight of the fire retardant composition and preferably in the presence of a surfactant. The so-treated insulation material is then maintained in a hot and humid atmosphere, as in a closed conditioning bin, for a prolonged period of time prior to drying.

3 Claims, 1 Drawing Figure

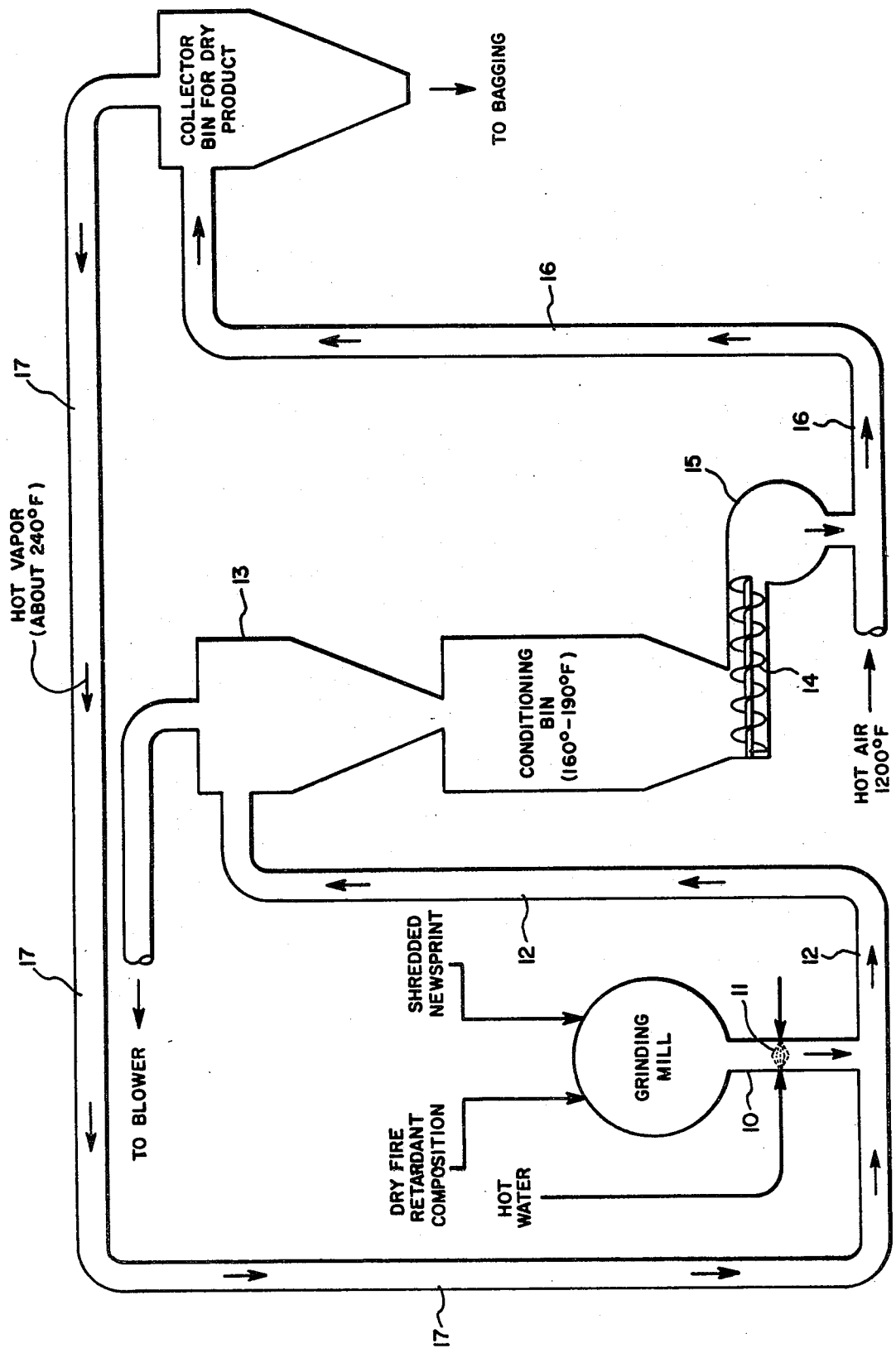

WET PROCESSING APPARATUS FOR RENDERING CELLULOSIC INSULATION PARTICLES FIRE-RETARDANT

RELATED APPLICATIONS

The present application is a division of my application Ser. No. 183,359, filed Sept. 2, 1980 now U.S. Pat. No.4,386,118 which is, itself, a continuation-in-part of my now abandoned, earlier application Ser. No. 032,119, filed Apr. 22, 1979, entitled "Wet Process for Rendering Cellulosic Insulation Particles Fire-Retardant."

BACKGROUND OF THE INVENTION

1. Field

The invention has to do with the manufacture of cellulosic insulation material and with apparatus employed for the purpose.

2. State of the Art

A widely used insulating material for homes and other buildings is commonly manufactured by grinding shredded waste paper, particularly newsprint, in suitable equipment such as a hammer mill while beating a fire retardant composition such as boric acid thereinto, usually in the presence of just enough moisture to cool the mill and to prevent the giving off of dust. For this purpose, approximately 2% by weight of water is normally added to the mill while operating and the product is dry on discharge from such equipment.

Either boric acid or a borate is the preferred fire retardant composition in the industry; however, other less expensive and more readily available fire retardants have been substituted in whole or in part for these preferred retardants. Aluminum sulfate and ammonium phosphates have been the principal substitutes. These substitutes, though effective as fire retardants, have imparted many undesirable properties to the insulation and have caused many consumer complaints.

In recent years there has been an extreme shortage of boric acid and borates. This has led to greater use of the substitute fire retardants and to severe repercussions in terms of consumer complaints. Accordingly, federal specifications for cellulose insulation were adopted on June 15, 1978.

Federal Specification HH-I-515D, which has also been adopted by most state and local authorities, very severely curtails use in and in most cases prevents use in cellulose insulation of hygroscopic fire retardant chemicals. Among the federal specifications relating to fire retardants are:

A. Settled Density
B. Moisture Absorption
C. Corrosion
D. Fungal Resistance.

Specifications A and B are related. An insulation which settles loses thermal insulation values. Moisture absorption increases its weight and causes it to settle. Since untreated paper undergoing the applicable test will increase in weight about 7 to 9%, the limit normally being 15%, the fire retardant cannot be hygroscopic.

Corrosion is a severe problem. Tests are made on steel, aluminum, and copper. Many corrosion problems can be alleviated by pH control, but copper, ammonium salts, and carbon dioxide in the air form a copper ammonium carbonate, which results in extremely severe corrosion.

Fungal resistance is a problem in humid areas of the United States. Moisture absorption encourages this, and, together with the positive nutrient factors in ammonium salts, excludes such fire retardants from consideration.

Attempts have been made in the past to reduce the quantity of boric acid or borate retardant required to impart desired fire retardancy to waste paper insulation. The usual approach has been to soak the paper particles in the fire retardant solution, to press out excess moisture, and to then dry the paper. However, this has not proven to be economical and is rarely if ever used commercially. The pressed material retains approximately 80% by weight of the water and requires drastic drying procedures. The very high costs of the required drying equipment and of operating it make the process uneconomical, but in view of the fact that paper insulation, when soaked with a solution of boric acid or a borate and then dried, will require considerably less of such fire retardant as will insulation with dry add-on, many manufacturers have sought a commercially usable wet treatment for cellulose insulation.

Gerber U.S. Pat. No. 3,259,104, filed in 1962 represents one such attempt. Gerber injects steam into shredded newsprint insulation shortly prior to its being passed into a bagging collector. He utilizes no drying other than the air stream in which the insulation is carried, and the insulation has possibly two to three seconds of moisture contact prior to bagging. From about 15 to 28% of a mixture of boric acid and borax is used as a fire retardant, together with some aluminum sulfate. Despite the fact that he uses steam, Gerber states that the add-on rates are adequate whether steam is used or not. Thus is equivalent to saying that the steam contributes nothing. In 1962, dry add-on rates were from 15 to 25%, so no saving was achieved by this process.

A somewhat different approach is used in Kuechler U.S. Pat. No. 3,666,544 filed in 1970. There, hygroscopicity of certain fire retardants is utilized. A urea-diammonium, phosphate-precipitated silica composition in powder form is applied to cotton batting immediately prior to exposure of the latter to a humidified atmosphere in the presence of steam. The chemical mixture is extremely hygroscopic and soluble. Moisture condensate is absorbed by and dissolves this hygroscopic fire retardant and carries it into the pores of the cotton fibers. Laboratory tests performed by me show that the product remains wet. A 10% by weight addition of the fire retardant chemicals produces a 35% by weight moisture gain in the finished insulation.

Despite this prior art and the continuing need, no commercial wet process had been developed for the treatment of cellulose insulation with boric acid and/or borates up to the time of the present invention.

SUMMARY OF THE INVENTION

In accordance with the invention, not only are effective results achieved with an unusually small amount of the fire-retardant composition, but the resulting material has significantly higher insulating value than similar materials made by the usual dry processes. This means production of a cellulosic insulating material that can be marketed at a lower price than, and that need not be used in as great quantity as, heretofore.

These desirable results are attributable to the substantially thorough and uniform distribution of the fire-retardant composition achieved by the process of the invention and to the reduced weight and reduced bulk density of the treated particulate cellulosic material.

Boric acid, a borate, a combination of both, or the borate product of my U.S. Pat. No. 3,983,040 is used as the fire retardant. It is applied to the waste paper either dry during the grinding operation or immediately thereafter in aqueous solution as by spraying the solution thereon. Boric acid and borates are not readily soluble, and it is a feature of the invention that subsequent steps in the process are relied upon to insure substantially complete dissolving thereof when applied dry and effective penetration and surface distribution when applied in solution. It should be noted that, because of the presence of insoluble matter, the composition of my U.S. Pat. No. 3,983,040 should not be applied by spraying.

While Kuechler in his above-referred-to patent dissolves powdered fire retardant material of high hygroscopicity that has been applied to cotton fibers, by exposing such cotton fibers to a humid atmosphere in the presence of steam so as to produce small droplets of condensate for hygroscopic absorption, the shredded waste paper insulation in the present process has applied to it a limited quantity of water, usually from about 18% to about 25% by weight, and is then conditioned in a hot and humid atmosphere for a prolonged period of time for the purpose of dissolving undissolved fire retardant and for enabling the solution to soak into the cellulose fibers on the basis of a true wet process but using only a limited quantity of water.

I have found that it is not necessary to employ a hygroscopic fire retardant chemical, as does Kuechler with cotton batting, when utilizing a hot and humid atmosphere for conditioning purposes over a prolonged period of time in connnection with ground waste paper insulation to which a limited quantity of water has been applied, but that the highly desirable boric acid and borate fire retardants can be effectively applied in much less quantity through use of the process of this invention than when heretofore applied on either a dry or wet basis. Thus, as little as 1/5 the usual amount applied on a dry basis (considering this to be 25% by weight) produces satisfactory results depending upon the particular fire retardant composition and the quantity of water used (more water seems to be required the less fire retardant composition).

A surfactant is preferably though not necessarily added along with the fire retardant composition.

The conditioned cellulosic insulation material is then subjected to a drying step to release the free moisture content thereof to within the range of about 5 to 10 percent by weight.

Apparatus found most useful for carrying out the process includes the usual waste paper grinding mill arranged to discharge into one or more sprays of water or one or more sprays of a solution of boric acid or borate, depending upon whether or not the fire retardant has been applied dry in the grinding mill. The quantity of water employed in the spray or sprays and the rate at which the discharged ground paper is passed through the spray or sprays are controlled so that only the desired limited quantity of water is applied to the ground paper.

The wetted ground paper is introduced into a humidifying conduit through which it is carried to the top of a conditioning bin where it is maintained for a prolonged period of time in a humid atmosphere. The conditioned product is withdrawn from the bottom of the bin preferably into a disc mill to enhance fluffiness and then into a dryer conduit, where it is exposed to a stream of very hot drying air serving in effect as a flash dryer and is carried thereby to a collector bin which empties into a bagging station. Hot and humid air from the collector bin is recycled to the humidifying conduit.

THE DRAWING

The best mode contemplated for carrying out the invention is illustrated in the accompanying drawing wherein the single FIGURE thereof is a schematic representation, on a flow sheet basis, of apparatus for carrying out the process.

DETAILED DESCRIPTION OF ILLUSTRATED EMBODIMENT

It is presently preferred to apply the fire-retardant composition to the cellulosic insulation material, e.g. waste paper, during the usual size-reduction thereof in a grinding mill.

Thus, as indicated in the drawing, shredded newsprint and the dry fire-retardant composition are fed into a grinding mill, which may be a standard hammer mill, wherein the fire-retardant composition is, in effect, beaten into the paper as the newsprint is reduced to finely divided, particulate form.

The quantity of fire-retardant composition incorporated in a cellulosic insulation product is normally determined by performance standards prescribed by government regulation. The add-on is generally from twenty to thirty percent by weight of the insulation material for the usual dry process. In the present process, however, very considerably less than that normally employed in the usual dry process has been found sufficient to meet government performance standards, depending upon the particular flame retardant composition and the amount of add-on water.

The grinding mill is discharged directly into a conduit 10 fitted with spray nozzles through which sprays 11 of water, preferably hot, are applied to the discharged particles of cellulosic material. Such sprays dissolve and/or place in liquid suspension much of the fire-retardant composition applied to the cellulose particles. A surfactant in quantity effective to aid the particles of insulation material to absorb the applied moisture is preferably added to the water sprayed onto the material. Any of the known surfactants may be used, and the quantity utilized will be very small relative to the insulation material itself.

The supply of water to the spray nozzles for sprays 11 is controlled in accordance with the rate of discharge of cellulosic material from the grinding mill so that such cellulosic material will contain not more than from about fourteen to about forty-five percent moisture by weight above its equilibrium moisture. The preferred range, however, is from about eighteen to about twenty-five percent add-on moisture.

Hot vapor, recirculated from the dryer at about 240° F., is introduced into the wetted mass of cellulosic material in a humidifying conduit 12 and humidifies such material as it carries it to a conditioning bin, preferably by way of a vented collector chamber 13, as indicated. This will usually supply from about five to about ten percent of the moisture requirement noted above, by reason of vapor condensation. The wetted cellulosic material enters the conditioning bin at the top and remains in a hot and humid conditioning atmosphere for a prolonged period of time as it descends in the bin to a screw-conveyor discharge mechanism 14 at its bottom.

It should be understood that live steam may be substituted for or added to the recirculated hot vapor.

For a throughput of four tons of material per hour, a conditioning bin ten feet in diameter and fifteen feet high can be used. The residence time is preferably from about one-half to about one hour, but can be shorter or longer. As little as ten minutes residence time in the hot and humid atmosphere will give generally acceptable results. The conditioning temperature in the bin will be in the range of from about 140° to about 190° F., this being carry-over heat from the previous stages of the process.

Since there is a certain amount of compression of the wet material in the conditioning bin due to the weight, the conditioned material withdrawn from the bottom of the bin may be passed through a disc mill 15 for enhancing fluffiness prior to drying. The discharge from the disc mill drops into a stream of very hot air (600°–800° F.) in a conduit 16 serving as a flash dryer. From this flash drying stage, the material is deposited in a collecting bin for subsequent bagging, while the hot vapor is recycled into conduit 12 by way of a conduit 17.

The dry, cellulosic, insulating product will have a free moisture content of from about five to about ten percent by weight, will have the fire-retardant composition substantially uniformly distributed on the surfaces of the component cellulosic particles and impregnated thereinto, and will have an R value that is unusually high for the type of product concerned.

The quantity of water utilized in the process will vary in accordance with the nature and amount of the fire retardant composition employed. However, in all instances much less water is employed than has heretofore been thought necessary for a wet process. Thus, at least from seventy-five to one hundred percent by weight add-on water would have been thought necessary, whereas only from about fourteen to about forty-five percent is used in accordance with the invention. Below fourteen percent, distribution of the fire-retardant material tends to become unsatisfactory, while above forty-five percent the cost of drying becomes uneconomical.

Although the aforedescribed procedure using the specified equipment is presently preferred, it should be realized that the process can be satisfactorily carried out in a variety of ways and with various types of equipment that might be at hand. Thus, the dry, finely divided cellulose material from the grinder could be charged into a blender into which water is injected by spraying, for example. Live steam could be injected into the blender along with or after introduction of the water to elevate the temperature about 150° F. and to contribute additional moisture by condensation, or hot vapor from the dryer could be recycled. The resulting hot and humid mass would be discharged into a conditioning bin for the prolonged period of time required for conditioning.

A series of small scale tests were carried out in this manner, as follows:

EXAMPLE NO. 1

900 grams of a powdered fire-retardant material conforming to that of Draganov U.S. Pat. No. 3,983,040 were milled with 6,000 grams of paper to produce a cellulose insulation having a dry add-on of fire-retardant amounting to 15 percent by weight. The resulting 6,900 grams of material was then charged into a blender, where 5,500 grams of water were added by means of a fine spray and from steam condensation. Steam was passed through the blender until the required amount of water had been added and the temperature had risen to 190° F. The water content of the wet insulation was found to be 44 percent by weight. The hot wet mixture was then discharged into an insulated container, where it was sealed off and allowed to condition for 60 minutes. At the end of the conditioning time, the wet insulation was dried to about 10 percent free moisture content. A sample was removed and allowed to come to equilibrium under ambient conditions for 48 hours and was then fire tested. The performance of this sample in both flame spread and smoldering combustion proved to be superior to a similar sample prepared with 25 percent dry add-on of the same kind of fire-retardant material to the same kind of paper.

EXAMPLE NO. 2

900 grams of the same kind of fire-retardant material as in Example No. 1 were similarly milled along with 6,000 grams of the same kind of paper and were charged into the blender where 2,960 grams of water were added in the form of a spray and a steam condensate. This resulted in a water content for the final product of 30 percent by weight. Flame retardancy and smoldering combustion of the product were found to be superior to a dry add-on of 25 percent of the same type of fire-retardant material to the same type of paper insulation material.

EXAMPLE NO. 3

The procedures were the same as in Example Nos. 1 and 2, but only 700 grams of the fire-retardant material were used with 6,000 grams of the paper to give a loading in the finished product of 10 percent by weight. The amount of water was the same as in Example No. 2. Here, too, it was found that from the standpoints of flame spread and smoldering combustion the product was superior to a product having the same fire-retardant material at a 25 percent dry add-on loading.

EXAMPLE NO. 4

550 grams of the fire-retardant material were similarly used with 6,000 grams of the paper to give an add-on of 8 percent by weight. With the amount of water the same as in Example No. 2, flame spread and smoldering combustion were found to be equivalent to a 25 percent by weight dry add-on of the same fire-retardant material.

EXAMPLE NO. 5

Example No. 3 was repeated but with reduction of the conditioning time to 30 minutes. No perceptible differences in performance of the product was apparent.

EXAMPLE NO. 6

Again, Example No. 3 was repeated, but with extension of the conditioning time to 4 hours. Again, no perceptible differences in performance of the product were apparent.

EXAMPLE NO. 7

Example No. 3 was repeated, but this time the conditioning temperature was changed to 150° F. Performance of the product was not affected.

EXAMPLE NO. 8

Example No. 3 was repeated, but without the steam and without heating of any kind. Conditioning time was 4 hours. Performance of the product was not affected.

EXAMPLE NO. 9

Example No. 8 was repeated, with a conditioning time of only one hour. The product was not homogeneously wetted and performance was inferior to that of the product of Example No. 3.

EXAMPLE NO. 10

Example No. 9 was repeated with a surfactant added to the water spray. It improved wetting, but not to as great an extent as the use of heat. Performance of the product was between those of Example Nos. 9 and 3.

EXAMPLE NO. 11

Example No. 4 was repeated using 550 grams of powdered boric acid as the fire retardant material. Product performance was satisfactory, but not as good as with the product of Example No. 4.

EXAMPLE NO. 12

A fire retardant composition made up by combining 192 grams of borax (0.5 mol.) with 192 grams of boric acid was milled with 6,000 grams of waste paper to produce a cellulose insulation having a dry add-on of fire retardant amounting to 6 percent by weight. The thus treated insulation material was treated with 1,800 grams of water (22% add-on) as in Example No. 1 and conditioned at a temperature of 150° F. for 30 minutes. The results were superior to those achieved with a 25% dry add-on.

The above examples are indicative of what can be accomplished by use of the invention. Other similar tests showed that a 4% add-on of the same fire retardant composition as in Example No. 12 is inadequate regardless of the quantity of water used. A 5% add-on is adequate only at 28% water addition or above; results with a 16% water addition showed good flame spread resistance but poor smolder resistance.

Whereas this invention is here illustrated and described with specific reference to embodiments thereof presently contemplated as the best mode of carrying out such invention in practice, it is to be understood that various changes may be made in adapting the invention to different embodiments without departing from the broader inventive concepts disclosed herein and comprehended by the claims that follow.

I claim:

1. Wet process apparatus for rendering cellulosic insulation particles fire retardant by the use of a non-hygroscopic boric acid or borate composition, comprising a grinder for producing cellulosic insulation particles from cellulosic material such as waste paper; spray means for water or an aqueous solution, said spray means being located in the path of discharge of material from said grinder; conduit means for receiving cellulosic insulation particles wetted by said spray means; means for flowing a hot moist vapor through said conduit means as a carrier for the wetted insulation particles; a closed conditioning bin into the top of which said conduit means discharges; discharge means at the bottom of said conditioning bin; second conduit means into which said discharge means discharges conditioned insulation material from said conditioning bin; means for introducing hot drying air into said second conduit means for carrying said conditioned insulation material through said second conduit means; and means for collecting dried conditioned insulation material from said second conduit means.

2. Wet process apparatus in accordance with claim 1, wherein means are provided for recycling hot moist vapor from the second conduit means to the first conduit means to constitute the specified means for flowing a hot moist vapor.

3. Wet process apparatus in accordance with claim 1, wherein a fluffing mill is interposed between the conditioning bin discharge means and the second conduit means.

* * * * *